UNITED STATES PATENT OFFICE 1,976,186

AZO COLORING MATERIALS

Wilhelm Neelmeier, Sebastian Gassner, and Wilhelm Meiser, Leverkusen-I. G. Werk, Germany, assignors to General Aniline Works, Inc., New York, N. Y., a corporation of Delaware No Drawing. Application April 30, 1932, Serial No. 608,560. In Germany May 9, 1931

8 Claims. (Cl. 260—76)

The present invention relates to water insoluble coloring materials, and to fibre colored therewith, more particularly it relates to coloring materials which may be represented by the probable general formula:

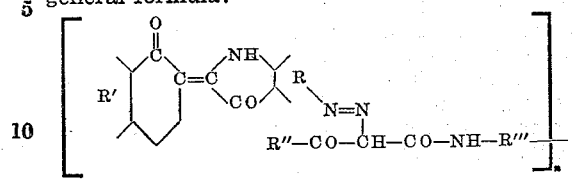

wherein R and R' represent benzene or naphthalene nuclei, R'' stands for alkyl or for a benzene or naphthalene nucleus, R''' stands for a benzene or naphthalene nucleus and $n$ stands for the numbers one or two, and wherein all aromatic nuclei may be substituted by substituents which do not induce solubility in water, such as the sulfonic acid or carboxylic acid group; as substituents coming into consideration for the purpose of our invention, there may be mentioned by way of example, halogen, alkyl and alkoxy.

Our new coloring materials are obtainable in substance or on the fibre according to the methods known in the art of producing pigments or ice colors by diazotizing an amino-indole naphthalene- or amino-indole anthracene-indigo of the general formula:

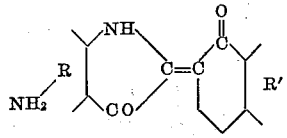

wherein the figures R and R' mean the same as stated above, and coupling in substance or on the fibre with an acyl-acetic-arylamide, such as acetoacetic acid-anilide, -o-anisidide, -o-chloroanilide, -o-toluidide, -naphthylamide, further such acyl-acetic-arylamides as contain twice the grouping —CO—CH$_2$—CO—NH—R''' (R''' meaning the same as stated above) such as terephthaloyl-bis-acetic-acid-arylamides of the formula:

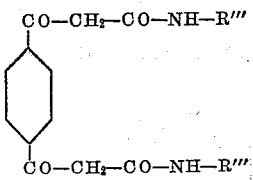

and we wish it to be understood that the coloring materials obtained by diazotizing 2 molecular proportions of an amino-indole naphthalene- or an amino-indole anthracene-indigo of the above general formula and coupling with 1 molecular proportion of the coupling compound of the kind referred to containing twice the grouping CO—CH$_2$—NH—R''' fall within the scope of the first general formula.

The starting amino-indoe naphthalene- or amino-indole anthracene-indigos are obtainable according to known methods, for example, by converting by a method analogous to that described in "Berichte der Deutschen Chemischen Gesellschaft," vol. 41, 1908, page 775, the corresponding nitro-isatin into the nitroisatin-chloride by the action of phosphorus pentachloride and condensing with the corresponding naphthol or hydroxyanthracene, for example, in chlorobenzene at temperatures between about 50 and 100° C. The nitroindigo thus obtainable is then reduced with caustic soda lye and hydrosulfite.

Our new coloring materials are, when produced in substance, generally water insoluble, blackish-green powders; when produced on the fibre, they generally yield green shades of good fastness properties.

The invention is illustrated by the following examples, without being limited thereto:

*Example 1.*—50 grams of cotton are impregnated with an aqueous caustic soda solution of 3 grams per litre of diacetoacetyl-o-toluidine and developed in a bath containing 4.6 grams per litre of diazotized 5-aminoindole-4'-methoxynaphthalene-indigo. The cotton is rinsed thoroughly, soaped and dried. A green is obtained of very satisfactory fastness to washing and to soaping at the boil. The coloring material corresponds to the following formula:

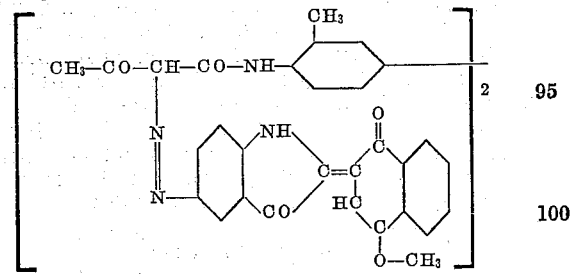

The diazotization component is prepared by condensing 5-nitro-isatin-chloride with 1-hydroxy-4-methoxynaphthalene and reducing the nitro group.

The 5-nitro-isatin is obtainable by nitrating isatin according to the method described in "Berichte der Deutschen Chemischen Gesellschaft," vol. 12, page 1312.

*Example 2.*—When in Example 1 the 5-amino-indole-4'-methoxynaphthalene-indigo is replaced by 4.7 grams of 5-amino-indole-4'-chloronaphthalene-indigo, and the process is carried out as described in Example 1, there is obtained a dark green of similar fastness properties but satisfactory fastness to chlorine. The coloring material corresponds to the following formula:

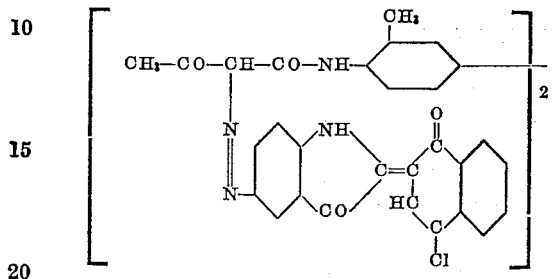

The diazotization component is prepared by condensing 5-nitroisatin-chloride with 1-hydroxy-4-chloronaphthalene and reducing the nitro group.

When replacing the 5-aminoindole-4'-chloronaphthalene-indigo by the corresponding 5-aminonaphthalene-4'-acetyl- or -4'-benzoyl-naphthalene-indigo respectively similar shades of good fastness properties are obtained.

*Example 3.*—22 grams of aceto-acetic acid-o-anisidide are dissolved in 10 ccs. of 35° Bé. caustic soda and one litre of water and 15 grams of sodium carbonate are added. A diazo solution produced from 31.8 grams of 5-aminoindole-4'-methoxynaphthalene-indigo, 28 ccs. of 18° Bé. hydrochloric acid and 6.9 grams of sodium nitrite is run in. A green coloring material corresponding to the following formula:

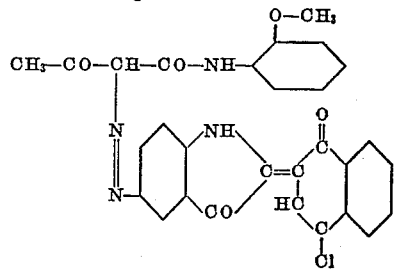

separates, which is filtered and dried; the dark green powder dissolves in concentrated sulfuric acid with green coloration.

*Example 4.*—10 grams of benzoyl-acetic acid anilide are stirred with 10 ccs. of a 50% Turkey red oil and 10 ccs. of caustic soda lye of 38° Bé., dissolved with the aid of hot water, and made up with water to one litre. With this solution 50 grams of cotton are impregnated for half an hour at 30° C., squeezed off and developed in a bath containing 4.5 grams per litre of diazotized 5-aminoindole-4'-methoxynaphthalene-indigo. A green is obtained of very satisfactory fastness to washing and boiling. The coloring material corresponds to the following formula:

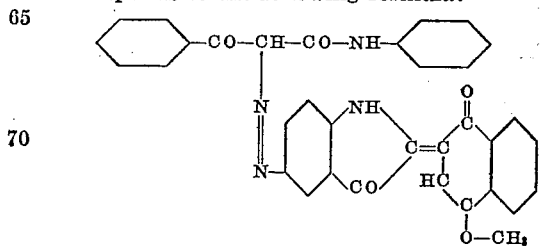

*Example 5.*—When replacing in Example 1 the 5-amino-indole-4'-methoxynaphthalene-indigo by 5 grams of 4-methyl-5-amino-7-methoxyindole-4'-chloro-naphthalene-indigo and performing the process as described in Example 1, an olive-green of good fastness to light and chlorine is obtained. The coloring material corresponds to the following formula:

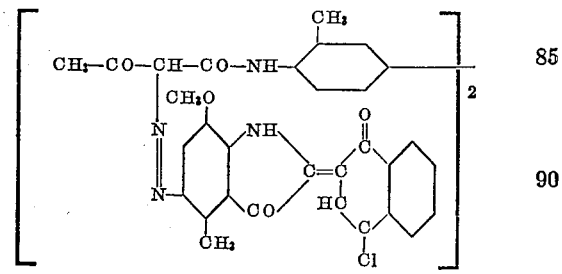

*Example 6.*—50 grams of cotton are impregnated for half an hour in an aqueous caustic soda solution containing 1 gram of terephthaloyl-bis-acetic acid-2-methoxy-4-chloro-5-methylanilide, squeezed off and introduced for about 20 minutes into a diazo bath prepared in the usual manner and containing 5,2 grams of diazotized 3'-amino-4.5-benzindole-4'-methoxynaphthalene-indigo. Then the cotton is rinsed thoroughly, soaped and dried. Thus is obtained an olive-green. The coloring material corresponds to the following formula:

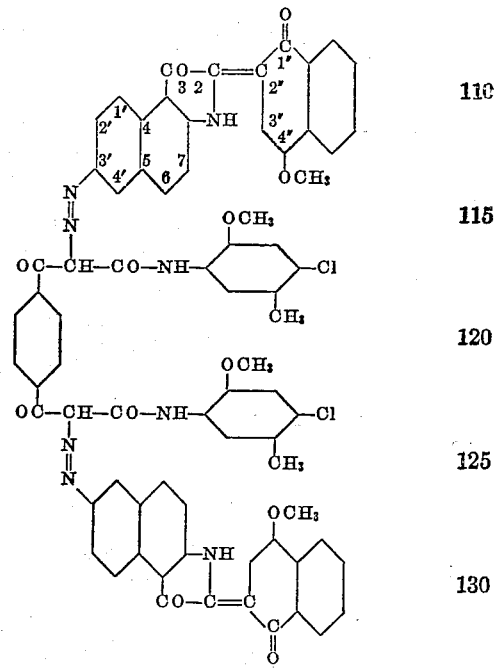

The terephthaloyl-bis-acetic acid-2-methoxy-4-chloro-5-methylanilide is prepared by starting with terephthaloyl-bis-acetic acid ester described in "Journal für praktische Chemie", vol. 74, page 125, and transforming the same into the arylamide according to known methods.

We claim:

1. Coloring materials of the general formula:

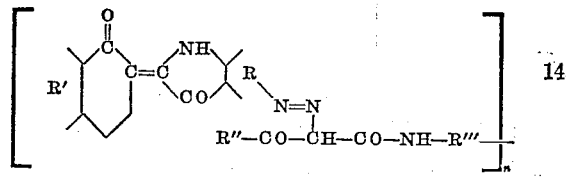

wherein R and R' represent benzene or naphthalene nuclei, R'' stands for alkyl or for a benzene or naphthalene nucleus, R''' stands for a benzene or naphthalene nucleus and $n$ stands for the numbers one or two, and wherein all aromatic nuclei may be substituted by substituents selected from the group consisting of halogen, alkyl, alkoxy and acyl, being, when produced in substance, generally water-insoluble, blackish-green powders and yielding, when produced on the fibre, generally green shades of good fastness properties.

2. Coloring materials of the general formula:

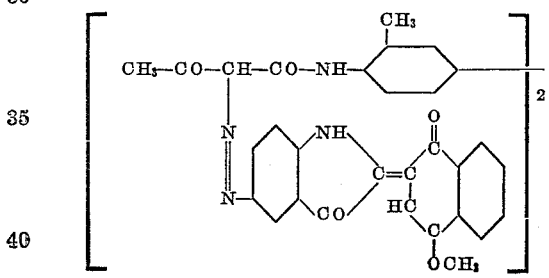

wherein R, R' and R''' stand for benzene nuclei, R'' stands for alkyl or a benzene nucleus and $n$ stands for the numbers one or two, and wherein all aromatic nuclei may be substituted by substituents selected from the group consisting of alkyl, alkoxy, halogen and acyl, being, when produced in substance, generally water insoluble, blackish-green powders and yielding, when produced on the fibre, generally green shades of good fastness properties.

3. A coloring material of the following formula:

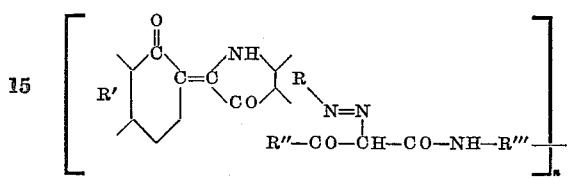

yielding, when produced on the fibre, green shades of very satisfactory fastness to washing and to soaping at the boil.

4. A coloring material of the following formula:

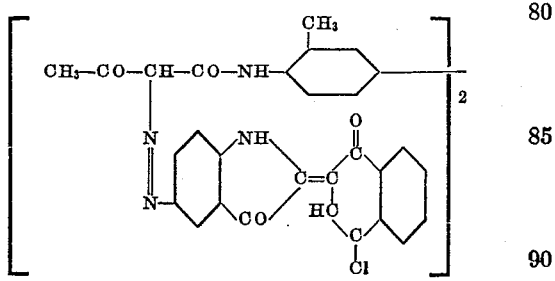

5. Fibre colored with the coloring materials as claimed in claim 1.
6. Fibre colored with the coloring materials as claimed in claim 2.
7. Fibre colored with the coloring material as claimed in claim 3.
8. Fibre colored with the coloring material as claimed in claim 4.

WILHELM NEELMEIER.
SEBASTIAN GASSNER.
WILHELM MEISER.